March 7, 1950 — J. C. SOMMER — 2,499,885
SELF-WATERING RESERVOIR TYPE PLANT HOLDER
Filed Sept. 25, 1945 — 2 Sheets-Sheet 1
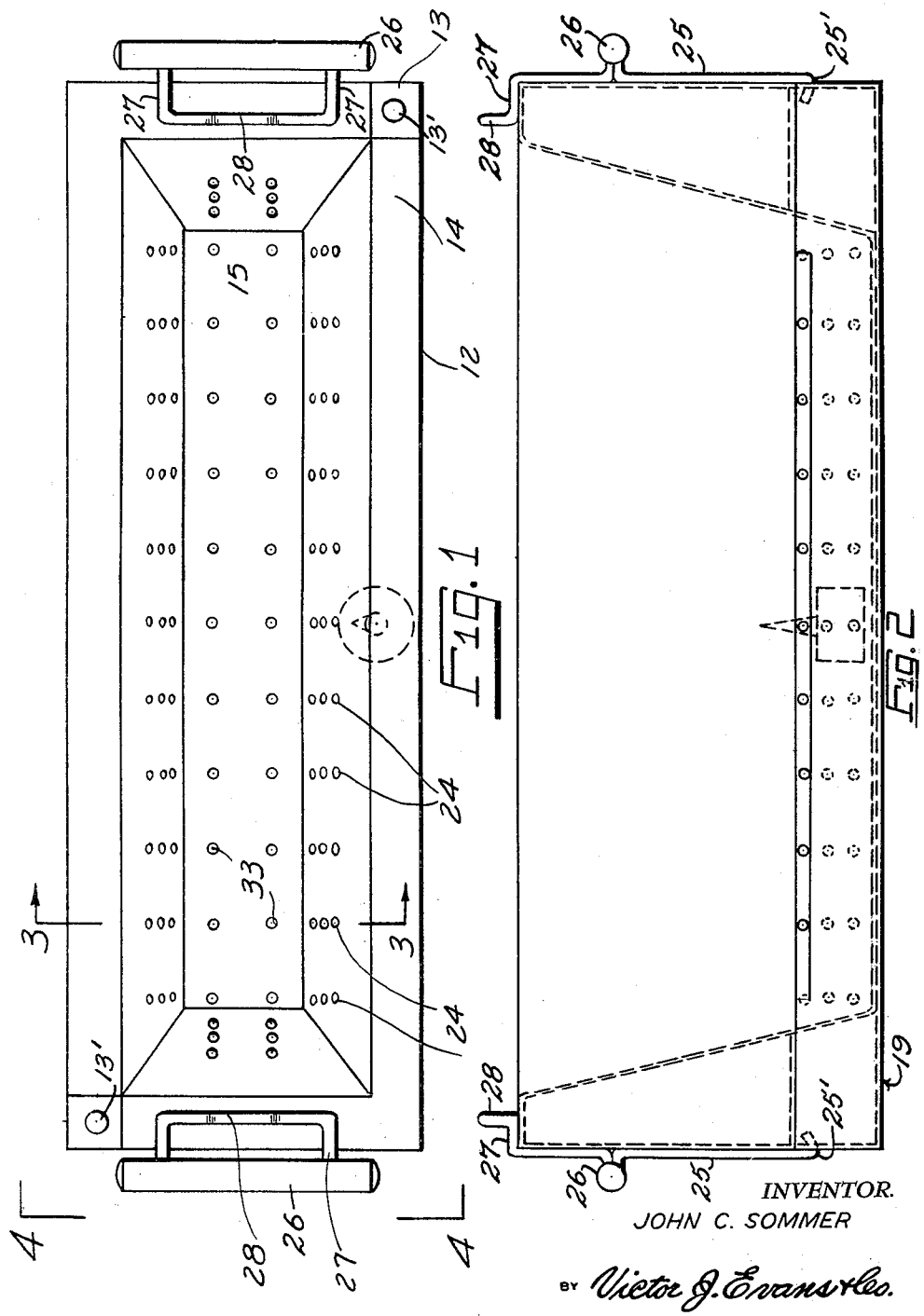
INVENTOR.
JOHN C. SOMMER
BY Victor J. Evans & Co.
ATTORNEYS March 7, 1950  J. C. SOMMER  2,499,885
SELF-WATERING RESERVOIR TYPE PLANT HOLDER
Filed Sept. 25, 1945  2 Sheets-Sheet 2
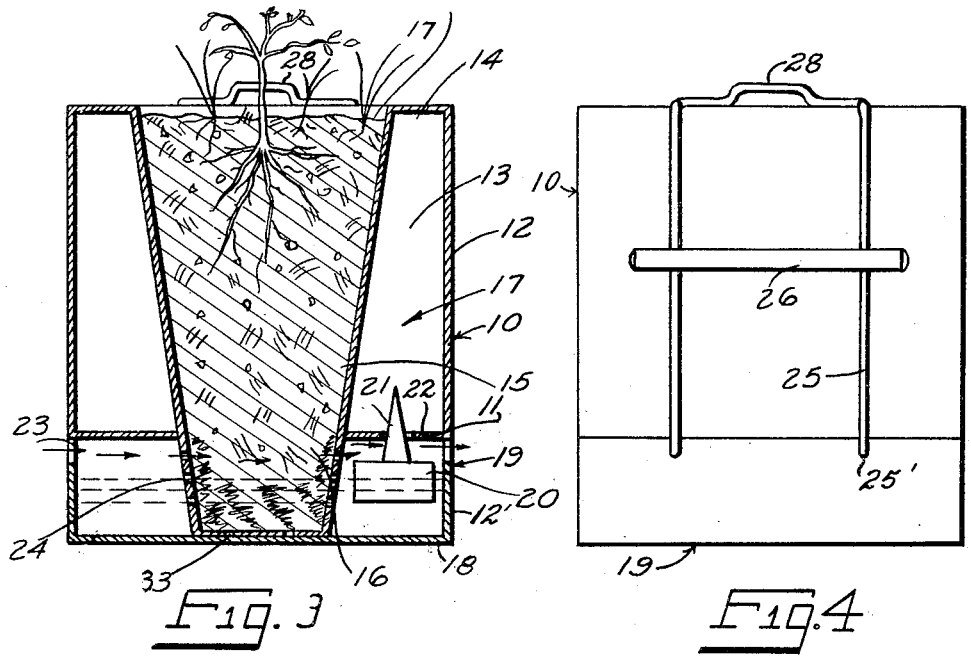
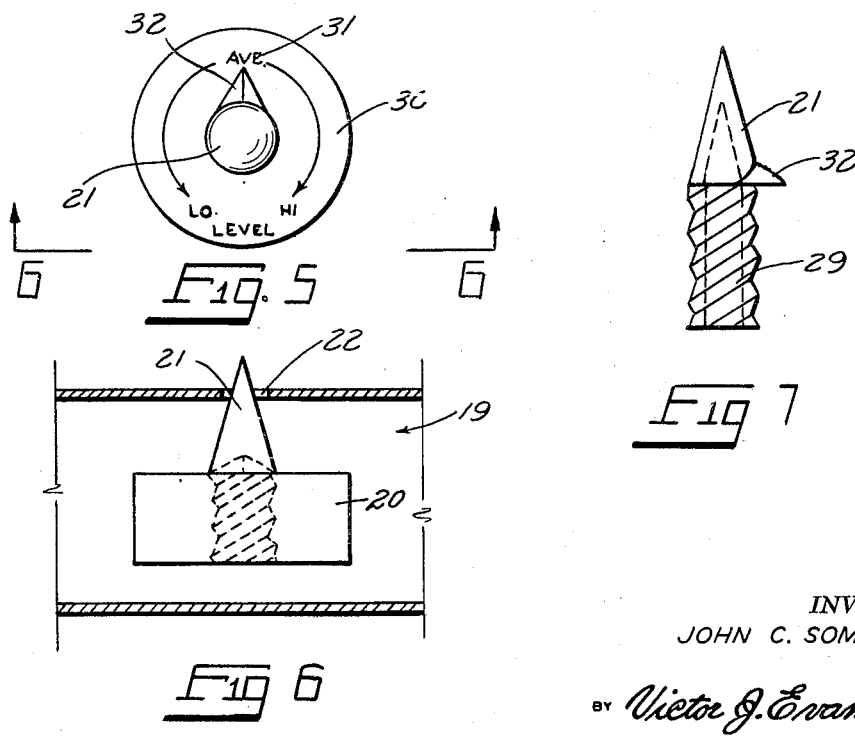
INVENTOR.
JOHN C. SOMMER
ATTORNEYS Patented Mar. 7, 1950

2,499,885

UNITED STATES PATENT OFFICE 2,499,885

SELF-WATERING RESERVOIR TYPE PLANT HOLDER

John C. Sommer, Saginaw, Mich.

Application September 25, 1945, Serial No. 618,455

2 Claims. (Cl. 47—38)

The invention relates to a flower or plant box, and more especially self-watering reservoir type plant holder.

The primary object of the invention is the provision of a holder of this character, wherein growing flowers or plants can be placed therein for propagation and growing, the flowers or plants being automatically watered so as to keep the earth moist, and to eliminate excess water of the same.

Another object of the invention is the provision of a holder of this character, wherein its construction renders it readily portable, and requires little or no attention, as the flowers or plants held thereby will be properly watered, or vitamins and plant food can be administered thereto without manual labor, as such is effected automatically, the plants or flowers being susceptible or deep rooting, as would be the case in natural surroundings or in outside soil.

A further object of the invention is the provision of a holder of this character, wherein the soil therein will be relieved of souring, the watering of the flowers or plants being through capillary attraction, and at atmospheric temperature, the holder being novel in construction, and is unique in the assembly of its parts, these being few in number.

A still further object of the invention is the provision of a holder of this character, which is simple in construction, thoroughly reliable and efficient in operation, strong, durable, neat in appearance, automatic in the working thereof, requiring minimum attention, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings—

Figure 1 is a top plan view of the holder constructed in accordance with the invention.

Figure 2 is a side view thereof.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a fragmentary plan view showing in detail the water level indicator.

Figure 6 is a sectional view taken on the line 6—6 of Figure 5 looking in the direction of the arrows.

Figure 7 is a side elevation of the indicator per se.

Similar reference characters indicate corresponding parts throughout the several views in the drawings.

Referring to the drawings in detail, the holder constituting the present invention, comprises an elongated or substantially rectangular shaped box-like body 10 and a similar-shaped font 19, both made from sheet material, preferably metal, although it may be constructed or built from any suitable material. The body 10 is formed with a flat bottom 11, vertical upstanding side walls 12, vertical upstanding end walls 13, and a top rim 14, respectively, the latter being entirely about a substantially hopper-shape well or valley 15, which opens through the top portion of such body and is of a depth correspondingly to the combined depth of the body 10 and font 19, centrally located and receives a filling of earth 16, in which are planted the flowers or plants to be propagated or grown.

Between the walls of the body 10 and the walls of the well or valley 15 and entirely about the latter is a water reservoir 17, which at the lower portion thereof is located the horizontal dividing panel or partition 11 forming a bottom for the reservoir 17, and functions also as a top for the water font 19 beneath the reservoir 17. This font 19 has bouyant therein a float 20, preferably made from cork and has a centrally arranged vertical conical shaped valve projection 21 adapted to freely play through a port 22 in the panel or partition 11, so as to regulate the flow of water from the reservoir 17 into the font 19, as should be apparent from Figure 3 or Figure 5 of the drawings. The reservoir 17 is filled through a plug 13'.

In the side walls 12' slightly above the water level in the font 19, are air vents 23 to permit ingress of atmospheric air into such font.

In the side and end walls of the well or valley 15 are vertically and horizontally spaced perforations or holes 24, so that water from the font 19 will gain admission to the earth 16 within such well or valley for absorption, and in this manner the plants or flowers are automatically watered.

Hooked into openings 25' in the end walls 13' of the font 19 from the exterior thereof, is a pair of handling yokes 25 which have inturned portions 27 snapped over the top rim 14, as best seen in Figures 1 and 2 of the drawings, while carried by these yokes 25 are hand grips 26, so that the holder can be bodily carried or rendered portable for the handling thereof. The inturned portions 27 of these yokes 25 also provide handle loops 28, as best seen in Figures 3 and 4 of the drawings.

The valve projection 21 is provided with an adjustable screw shank 29 tapped into the float 20, which at its upper face is marked with a scaled dial 30, having spaced indicia 31 indicative of high, low and average levels, for the water within the font 19, the valve projection 21 being formed with an indicator hand or pointer 32 to register with the indicia 31, selectively, so that the water level can be controlled within such font. The font 19 is separable from the body 10, and is held detachable therefrom by the yokes 25, thus such font being readily accessible for adjustment of the indicator. It is preferable that the yokes 25 effect the clamping of the font 19 and body 10 together, as should be obvious from Figures 2 and 4 of the drawings, the yokes being hooked into the end walls 13' of the font. It is also desirable that the well or valley have apertures or holes 33 in its bottom for equalizing water absorption.

The valve projection 21 seats itself in the port 22 for the closing thereof when the level of water reaches a determined height within the font 19.

When the font 19 is detached, the indicator can be set according to the dial therefor, and also this font can be properly cleaned.

The holder is a self-watering reservoir type plant box or holder.

What is claimed is:

1. A holder of the kind described, comprising a reservoir having a bottom font and a communicating port therebetween, a well within the reservoir and depending into the font and having fluid admitting openings thereto from said font, a float in said font, a cone-shaped valve riding in said communicating port for controlling communication between the reservoir and font, means threadably securing the cone-shaped valve to the float for adjusting the valve relative to the float for regulating its controlling activity between the reservoir and font, indicator means for determining the extent of adjustment of the last named means, and a pair of yokes having preformed ends adapted to engage the upper ends of the reservoir and the ends of the font for detachably securing the font to the reservoir, the well being accessible through the top of the reservoir by means of said reservoir fill plugs removably mounted in the top of said reservoir.

2. A holder of the kind described, comprising a reservoir having a bottom font and a communicating port therebetween, a well within the reservoir and depending into the font and having fluid admitting openings thereto from said font, a float in said font, a cone-shaped valve riding in said communicating port for controlling communication between the reservoir and font, means threadably securing the cone-shaped valve to the float for adjusting the valve relative to the float for regulating its controlling activity between the reservoir and font, indicator means for determining the extent of adjustment of the last named means, a pair of yokes having preformed ends adapted to engage the upper ends of the reservoir and the ends of the font for detachably securing the font to the reservoir, the well being accessible through the top of the reservoir by means of said reservoir fill plugs removably mounted in the top of said reservoir, and hand grips on the yokes for detachably securing the font and reservoir.

JOHN C. SOMMER.

REFERENCES CITED

The following references are of record in the file of this patent:

UNITED STATES PATENTS

| Number | Name | Date |
|---|---|---|
| 2,249,197 | Brundin | July 15, 1941 |